(12) United States Patent  
Shukh

(10) Patent No.: US 9,263,189 B2  
(45) Date of Patent: Feb. 16, 2016

(54) MAGNETIC CAPACITOR

(71) Applicant: Alexander Mikhailovich Shukh, San Jose, CA (US)

(72) Inventor: Alexander Mikhailovich Shukh, San Jose, CA (US)

(*) Notice: Subject to any disclaimer, the term of this patent is extended or adjusted under 35 U.S.C. 154(b) by 36 days.

(21) Appl. No.: 14/260,252

(22) Filed: Apr. 23, 2014

(65) Prior Publication Data

US 2014/0313637 A1   Oct. 23, 2014

Related U.S. Application Data

(60) Provisional application No. 61/814,826, filed on Apr. 23, 2013.

(51) Int. Cl.
*H01G 4/008* (2006.01)
*H01G 4/015* (2006.01)
*H01G 4/20* (2006.01)

(52) U.S. Cl.
CPC .............. *H01G 4/008* (2013.01); *H01G 4/015* (2013.01); *H01G 4/20* (2013.01)

(58) Field of Classification Search
CPC .......... H01G 4/008; H01G 4/015; H01G 4/20
See application file for complete search history.

(56) References Cited

U.S. PATENT DOCUMENTS

| | | | |
|---|---|---|---|
| 6,272,036 B1 | 8/2001 | You et al. | |
| 6,830,824 B2* | 12/2004 | Kikitsu et al. | 428/828.1 |
| 7,529,078 B2* | 5/2009 | Wang et al. | 361/328 |
| 7,663,197 B2* | 2/2010 | Nagase et al. | 257/421 |
| 7,821,771 B2 | 10/2010 | Lai | |
| 7,911,187 B2 | 3/2011 | Lai et al. | |
| 8,039,913 B2* | 10/2011 | Zheng | G11C 11/16 257/421 |
| 8,149,568 B2 | 4/2012 | Lai et al. | |
| 8,988,934 B2* | 3/2015 | Shukh | H01L 29/82 365/148 |
| 9,058,885 B2* | 6/2015 | Luo | G11C 11/1675 |
| 2002/0031008 A1* | 3/2002 | Den et al. | 365/173 |
| 2005/0052902 A1* | 3/2005 | Smith et al. | 365/158 |
| 2008/0174933 A1* | 7/2008 | Lai et al. | 361/303 |
| 2008/0174936 A1 | 7/2008 | Lai et al. | |
| 2009/0050999 A1 | 2/2009 | Lai et al. | |
| 2009/0090946 A1 | 4/2009 | Lai et al. | |
| 2010/0078742 A1* | 4/2010 | Zheng et al. | 257/421 |
| 2010/0214718 A1* | 8/2010 | Yeh | 361/305 |

(Continued)

OTHER PUBLICATIONS

Y,. Ding, Y.D.Yao, K.T.Wu, J.C.Hsu, D.S.Hung, D.H.Wei, et al., Permittivity Enhancement of Ta2O5/Co/Ta2O5 Trilayer Films, IEEE Trans.Magnetics, vol. 47, No. 3, p. 710-713 (2011).

(Continued)

*Primary Examiner* — Michael Zarroli

(57) ABSTRACT

An apparatus for storing electrical energy comprising at least: a first multilayer section; a second multilayer section disposed above the first multilayer section; and a spacer layer disposed between the first and second multilayer sections and comprising a dielectric material, wherein each of the first and second multilayer sections comprising a pinned magnetic layer having a fixed magnetization direction, a free magnetic layer having a reversible magnetization direction, and an isolative layer disposed between the pinned and free magnetic layers, the pinned and free magnetic layers are substantially anti-ferromagnetically exchange coupled to each other through the isolative layer; and wherein the pinned magnetic layers of the first and second multilayer sections are electrically coupled in parallel with each other, and the free magnetic layers of the first and second multilayer sections are electrically coupled in parallel with each other.

19 Claims, 9 Drawing Sheets

(56) References Cited

U.S. PATENT DOCUMENTS

| | | | |
|---|---|---|---|
| 2011/0051313 A1* | 3/2011 | Hwang | 361/311 |
| 2011/0242726 A1* | 10/2011 | Chan | 361/311 |
| 2014/0160623 A1* | 6/2014 | Baer et al. | 361/301.4 |
| 2015/0013746 A1* | 1/2015 | Shukh | 136/244 |

OTHER PUBLICATIONS

D.S.Hung, Y.D.Yao, D.H.Wei, K.T.Wu, J.C.Hsu, T.Ding, Y.C.Chen, Permittivity study of multiferroic AlN/NiFe/AlN multilayer films, Journal of Applied Physics 103, 07E318 (2008).

* cited by examiner

MAGNETIC CAPACITOR

CROSS-REFERENCE TO RELATED APPLICATIONS

This application claims benefit of a provisional patent application No. 61/814,826, filed on Apr. 23, 2013 by the present inventor.

FEDERALLY SPONSORED RESEARCH

Not applicable.

SEQUENCE LISTING OF PROGRAM

Not applicable.

RELEVANT PRIOR ART

U.S. Pat. No. 7,821,771 B2, Oct. 26, 2010—Lai.
U.S. Patent Application Publication No. US 2011/0242726 A1, Oct. 6, 2011—Chan
U.S. Patent Application Publication No. US 2010/0214718 A1—Yeh
U.S. Patent Application Publication No. US 2008/0174933 A1, Jul. 24, 2008—Lai et al.
U.S. Patent Application Publication No. US 2008/0174936 A1, Jul. 24, 2008—Lai et al.

BACKGROUND

Energy storage devices such as capacitors and batteries play a significant role in our life. The capacitors are widely used in electronic circuits. The batteries found a broad application in numerous portable devices to store an electrical energy. The energy storage devices substantially influence performance and the working time of electrical devices.

However, traditional energy storage parts have some problems. For example, the capacitors have a low capacitance and suffer from a current leakage decreasing overall performance. The batteries have the memory problem of being partially charged/discharged and decreasing overall performance.

A Giant Magnetoresistance Effect (GMR) is a quantum mechanical effect observed in multilayer structures with alternating thin magnetic and nonmagnetic layers. The GMR effect shows a significant change in electrical resistance between two ferromagnetic layers separated from each other by a thin layer of nonmagnetic conductive material. The resistance of a multilayer structure can exhibit several times increase when a mutual orientation of magnetization directions in the adjacent ferromagnetic layers is changing from parallel to anti-parallel. Even higher resistance difference between the parallel and anti-parallel orientations of magnetization directions can be observed when two magnetic layers are separated by a thin layer on dielectric or semiconductor material. The difference in the resistance between two states of the magnetization can reach a thousand percents. The mutual orientation of the magnetization directions in the magnetic layers can be controlled by an external magnetic field or by a spin-polarized current running through the multilayer structure in a direction perpendicular to a plane of the layers. Hence, the GMR effect can be used to reduce a current leakage in the energy storage devices such as capacitors.

For the foregoing reasons, there is a need to develop a capacitor employing the GMR effect to store the electrical energy.

SUMMARY

According to one embodiment of the present application, an apparatus for storing electrical energy comprises a first conductive electrode, a second conductive electrode, an isolative layer disposed between the first and second conductive electrodes, a first magnetic layer disposed between the isolative layer and the first conductive electrode, and a second magnetic layer disposed between the isolative layer and the second conductive electrode, wherein the first and second magnetic layers are substantially anti-ferromagnetically exchange coupled to each other through the isolative layer.

According to another embodiment of the present application, an apparatus to store electrical energy comprises at least: a first multilayer section, a second multilayer section disposed above the first multilayer section; and an electrical battery comprising a first terminal having a positive polarity and a second terminal having a negative polarity, wherein each of the first and second multilayer sections comprises at least a first magnetic layer having a fixed magnetization direction, a second magnetic layer having a reversible magnetization, and an isolative layer disposed between the first and second magnetic layers, the first and second magnetic layers are substantially anti-ferromagnetically coupled to each other through the isolative layer, and wherein the first multilayer section and the section multilayer sections are coupled to the first and second terminals of the electrically battery.

BRIEF DESCRIPTION OF THE DRAWINGS

These and other features, aspects, and advantages of the present application will become better understood with regard to the following description, appended claims, and accompanying drawings where:

DETAILED DESCRIPTION

Figure 1:
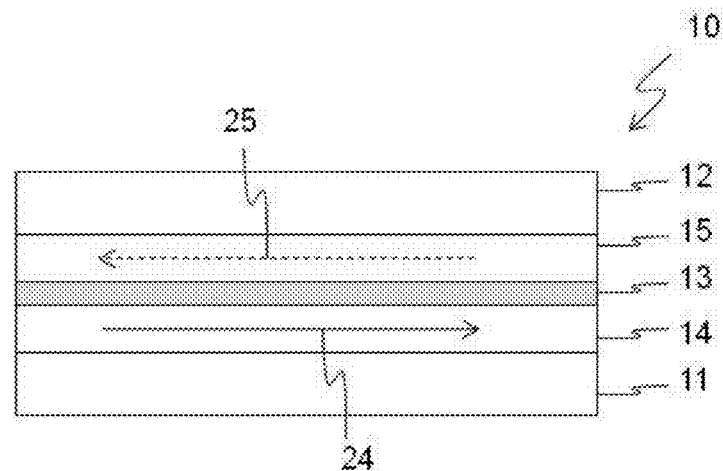
FIG. 1 is a schematic diagram illustrating a cross-sectional view of a magnetic capacitor according to an embodiment of the present application.

Reference will now be made in detail to the embodiments of the present application, examples of which are illustrated in the accompanying drawings. A numerical order of the embodiments is random. Wherever possible, the same reference numbers are used in the drawings and the description to refer to the same or like parts.

All figures are drawn for ease of explanation of the basic teachings of the present application only. The extensions of the figures with respect to number, position, relationship, and dimensions of the parts to form the embodiment will be explained or will be within the skill of the art after the following description has been read and understood.

FIG. 1 shows a schematic diagram of a cross-sectional view of a magnetic capacitor 10 according to a first embodiment of the present application. The capacitor 10 comprises a first conductive electrode 11, a second conductive electrode 12, a layer of an isolative material 13 disposed between the electrodes 11 and 12. The isolative layer 13 is separated from the electrodes 11 and 12 by magnetic layers 14 and 15, respectively. The magnetic layer 14 is disposed between the electrode 11 and the isolative layer 13 and has a direct contact with the isolative layer 13. Similarly, the magnetic layer 15 is disposed between the isolative layer 13 and the electrode 12.

The magnetic layers 14 and 15 can be made of magnetic material (or materials) comprising an in-plane anisotropy. One magnetic layer, for example the layer 14, can have a fixed magnetization direction 24 (shown by a solid arrow). The layer with the fixed magnetization direction can be called a hard (or pinned) magnetic layer. The layer 15 can have a reversible magnetization direction 25 (shown by dashed arrow). The layer with the reversible magnetization direction can be called a soft (or free) magnetic layer. The magnetization directions 24 and 25 are shown being oriented anti-parallel to each other. The anti-parallel orientation of the magnetization directions in the magnetic layers 14 and 15 corresponds to a high resistance state (low leakage current) between the layers. The magnetization directions 24 and 25 can be oriented in parallel to each other. This mutual orientation corresponds to a low resistance state (high leakage current).

The magnetization direction 25 of the free magnetic layer 15 can be reversed from parallel to anti-parallel and vice-versa by an external magnetic field or by a spin-polarized current running between to magnetic layers through the isolative layer 13. Also a combination of the external magnetic field together with the spin-polarized current can be used for reversal of the magnetization direction in the magnetic layer 15.

The capacitor 10 shown in FIG. 1 has an anti-parallel magnetization directions in the magnetic layers 14 and 15 which corresponds to the anti-ferromagnetic coupling between the magnetic layers and to a high resistance state. The parallel orientation of the magnetization directions shown in FIG. 1 can create the ferromagnetic coupling between the layers 14 and 15 which might result in a low resistance state associated with a higher leakage current across the isolative layer 13. A type of exchange coupling (ferromagnetic or anti-ferromagnetic) and its strength can depend on the thickness and material properties of the isolative layer 13. Besides, the strength of the exchange coupling can depend on thickness and properties of magnetic layers 14 and 15, such as a saturation magnetization, anisotropy, crystalline texture and others.

A capacitance of the capacitor 10 can be calculated using the equation (1):

$$C = \frac{\varepsilon_0 \varepsilon_r A}{d} \quad (1)$$

where C is the capacitance of the capacitor, $\varepsilon_0 = 8.8540 \cdot 10^{-12}$ F/m is a dielectric constant of a free space (or vacuum permittivity), $\varepsilon_r$ is a relative dielectric constant (or relative permittivity) of the isolative layer material, A is an area of the parallel electrodes 11 and 12, and d is the distance between the electrodes.

Equation (1) suggests that the capacitance C of the capacitor 10 is proportional to the area A of the parallel electrodes and to the relative permittivity $\varepsilon_r$ of the isolative material, but inverse proportional to the distance d between the electrodes that is frequently equal to the thickness of the isolative layer.

The permittivity of the isolative layer 13 can be increased by more than thousand times resulting in a significant capacitance increase of the magnetic capacitor 10. At an interface of the isolative and magnetic layers a symmetry of physicals properties of the contacting materials is broken. A violation of the symmetry leads to new spin and orbital ordering in the isolative layer. The broken symmetry can lead to a spontaneous electric polarization of the isolative material. The polarization of the isolative layer can be magnified by exchange coupling between spins of the isolative and magnetic layers having a direct contact with each other. Strength of this exchange can be controlled by a magnetic state of the magnetic layer. An electrical charge polarity accumulated at the interface can depend on the magnetization direction of magnetic layer. Hence, the permittivity of the isolative layer 13 can be controlled by a strength of exchange coupling between the magnetic layers, magnetization saturation, spin-polarization and other properties of the magnetic layers. A nature of this phenomenon is not fully understood at the moment. The isolative layer can be made of dialectic or semiconductor materials, or their based laminates.

Figure 2:
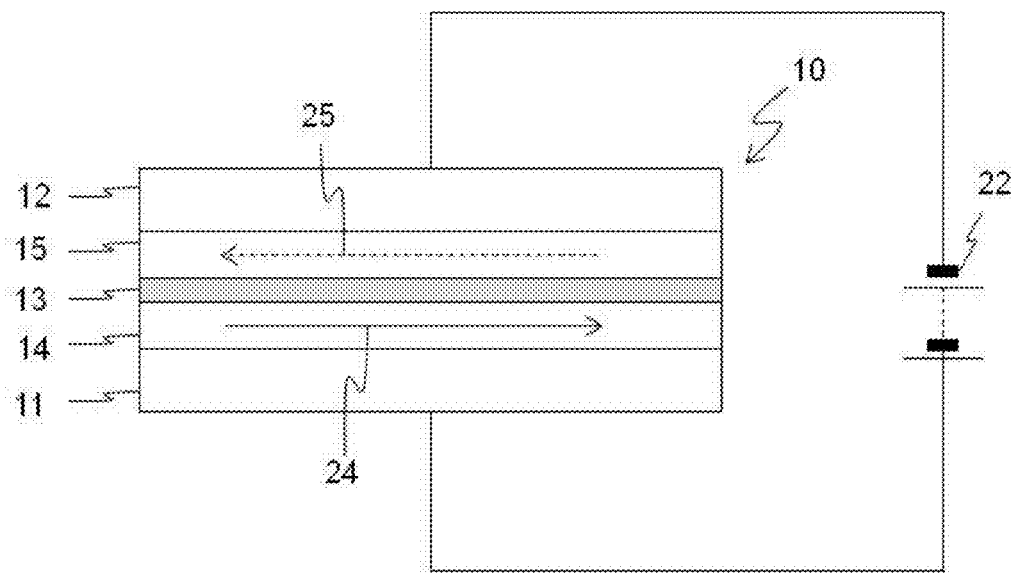
FIG. 2 shows the magnetic capacitor when the capacitor is charging according to an embodiment of the present application.

FIG. 2 shows a schematic diagram of the magnetic capacitor 10 electrically coupled to a battery 22 when the capacitor is charging. The capacitor 10 is electrically coupled to terminals of the battery 22 through the electrodes 11 and 12. The capacitor is in a high resistance (low leakage current) state providing by anti-ferromagnetic exchange coupling between ferromagnetic layers 14 and 15 through the isolative layer 13. The hard (pinned) magnetic layer 14 can have a coercivity higher than that of the soft (free) magnetic layer 15. The anti-parallel configuration of the magnetization directions in the magnetic layers 14 and 15 can be arranged by coupling the soft magnetic layer 15 to a negative terminal of the battery 22 and the hard magnetic layer 14 to a positive terminal, respectively. An application of a spin-polarized current through the isolative layer 13 in a direction from the hard magnetic layer 14 towards the soft magnetic layer 15 through the isolative layer 13 can arranged the magnetization direction 25 anti-parallel to the magnetization direction 24. This mutual orientation of the magnetization directions corresponds to a low leakage current state between the electrodes 11 and 12. A density of the spin-polarized current can be in a range from $0.5 \cdot 10^6$ A/cm$^2$ to $10 \cdot 10^6$ A/cm$^2$. An applied voltage should be less than a break down voltage of the isolative layer 13. A theory suggests that the leakage current in the magnetic capacitor can be reduced by more than ten times by switching from the parallel to anti-parallel configuration of the magnetization directions in the magnetic layers 14 and 15.

Figure 3:
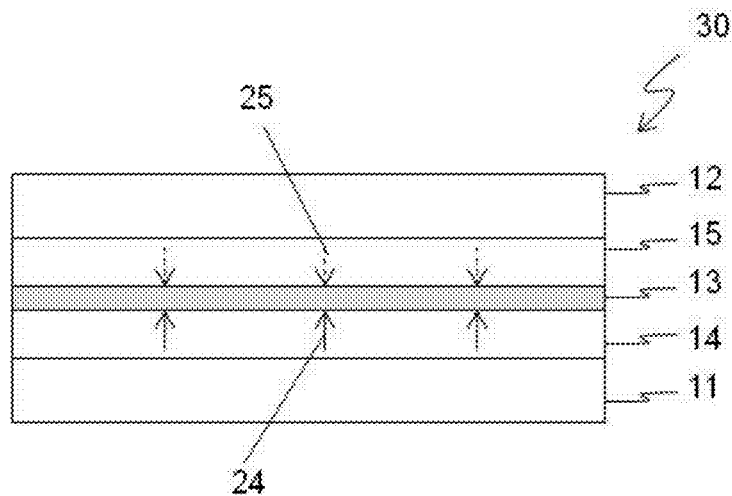
FIG. 3 is a schematic diagram illustrating a cross-sectional view of a magnetic capacitor comprising magnetic materials with a perpendicular anisotropy according to a second embodiment of the present application.

FIG. 3 shows schematic diagram of a cross-sectional view of a magnetic capacitor 30 according to a second embodiment of the present application. The capacitor 30 distinguishes from the capacitor 10 shown in FIG. 1 by use of a magnetic material (or materials) having a perpendicular anisotropy in the magnetic layers 14 and 15. The perpendicular magnetization direction in the layers 14 and 15 can provide reduction of the spin-polarized current required for reversal of the magnetization direction in the soft (free) magnetic layer 15.

The first electrode 11 of the capacitor 30 can be made of 10-nm thick Ru film. A hard (pinned) magnetic layer 14 can be made of 15-nm thick film of $Co_{75}Pt_{25}$ alloy having a perpendicular anisotropy. The isolative layer 13 can be made of 2-nm thick film of $Ta_2O_5$. The soft magnetic layer 15 can be made of a 1.5-nm thick film of CoFeVB having a perpendicular anisotropy. The second electrode 12 can be made of a multilayer comprising a 10-nm thick Ru film deposited on a 10-nm thick Ta film which has a direct contact with the layer of $Ta_2O_5$.

Figure 4:
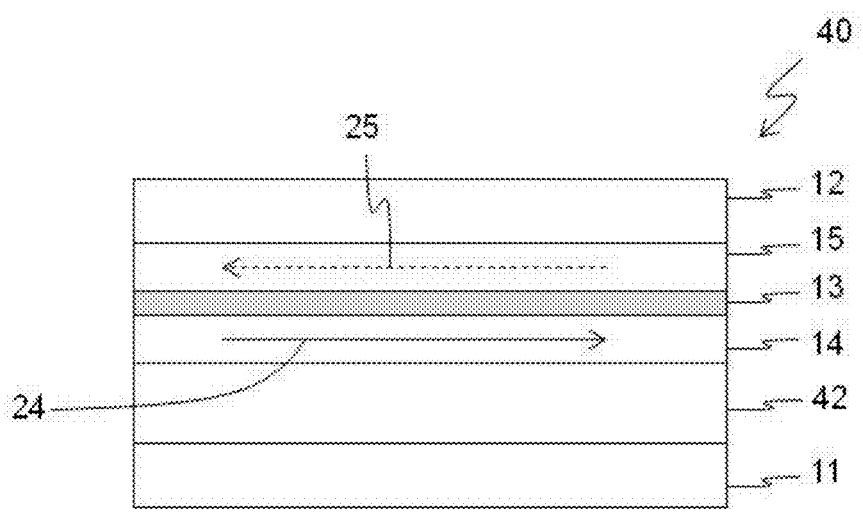
FIG. 4 is a schematic diagram illustrating a cross-sectional view of a magnetic capacitor comprising magnetic materials with an in-plane anisotropy according to a third embodiment of the present application.

FIG. 4 shows a schematic diagram of a cross-section view of a magnetic capacitor 40 according to a third embodiment of the present application. A pinning anti-ferromagnetic layer 42 is provided to the capacitor 40. The anti-ferromagnetic layer 42 is disposed between a first conductive electrode 11 and a pinned magnetic layer 14. The anti-ferromagnetic layer 42 has a substantial exchange coupling with the pinned magnetic layer 14 to fixed its magnetization direction 24 (solid arrow). The pinning anti-ferromagnetic layer 42 can prevent the pinned magnetic layer 14 from reversal of its magnetization direction when an external magnetic field or a spin-polarized current is applied to the capacitor for implementing the anti-parallel orientation of magnetization directions in the adjacent magnetic layers 14 and 15.

A first electrode 11 of the capacitor 40 can be made of a multilayer comprising a 5-nm thick film of $Ni_{81}Fe_{19}$ deposited on a Ta (5 nm)/Ru (20 nm)/Ta (5 nm) structure. The anti-ferromagnetic layer 42 can be made of 10-nm thick film of $Ir_{50}Mn_{50}$ alloy. The pinned magnetic layer 14 can be made of 3-nm thick $Co_{70}Fe_{30}$ film having a substantial spin polarization. The isolative layer 13 can be made of a 2.5-nm thick film of n-type SiC with a doping concentration of phosphorus (P) about $10^{13}$ cm$^{-3}$. A free (soft) magnetic layer 15 can be made of a bilayer structure composed by 1.5-nm thick film of $Co_{70}Fe_{30}$ and 2-nm thick film of $Ni_{81}Fe_{19}$ with the $Co_{70}Fe_{30}$ film being in a direct contact with the isolative layer 13. The second electrode 12 can be made of a three layer structure Ta (5 nm)/Ru (10 nm)/Ta (5 nm).

Figure 5:
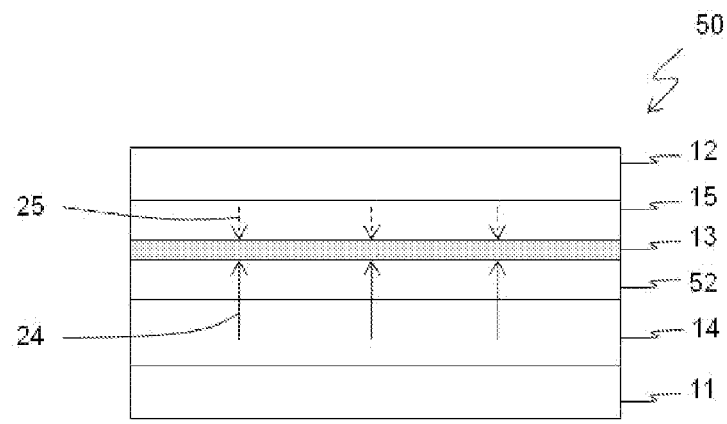
FIG. 5 is a schematic diagram illustrating a cross-sectional view of a magnetic capacitor comprising magnetic materials with a perpendicular anisotropy according to a fourth embodiment of the present application.

FIG. 5 shows a schematic diagram of a cross-sectional view of a magnetic capacitor 50 according to a fourth embodiment of the present application. A spin-polarizing layer 52 is disposed between a first pinned magnetic layer 14 and an isolative layer 13. The spin-polarizing layer 52 has a substantial ferromagnetic exchange coupling with the pinned magnetic layer 14. The exchange coupled layers 14 and 52 operate as a single hard magnetic layer.

A first electrode 11 of the capacitor 50 can be made of Ta(10 nm)/$Ni_{38}Cr_{62}$(7 nm) bilayer structure. The pinned magnetic layer can be made of $Co_{74}Pt_{16}Cr_{10}$ alloy having a thickness of 15 nm and a coercive force of about 3.5 kOe or above. The spin-polarizing layer 52 can be made of 3-nm thick film of $Co_{50}Fe_{50}$. The layers 14 and 52 can be substantially exchange coupled to each other and perform as a single magnetic layer with a perpendicular magnetization direction 24. The isolative layer 13 can be made of 2-nm thick layer of $SrTiO_3$ oxide. A free magnetic layer 15 can be made of 1.2-nm thick film of $Fe_{60}Co_{20}B_{20}$ having a perpendicular magnetization direction 25. A second electrode 12 can be made of a multilayer structure Hf (5 nm)/Ta(5 nm) with Hf film having a direct contact with the free magnetic layer 15.

Figure 6:
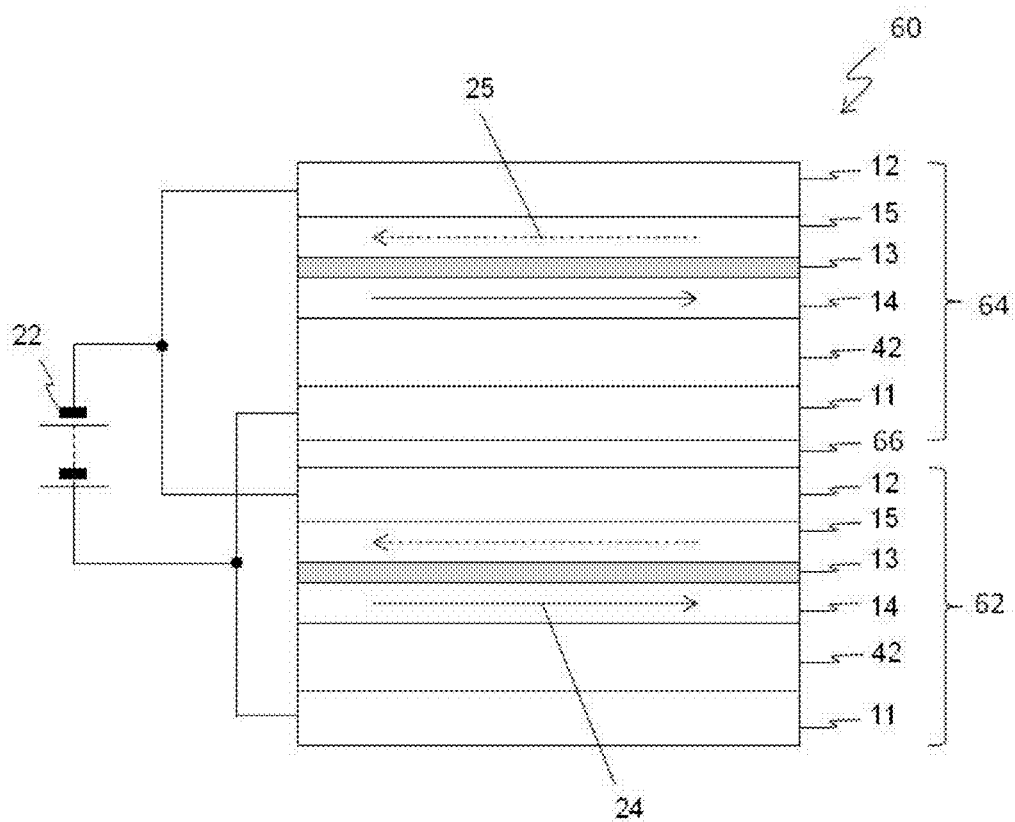
FIG. 6 is a schematic diagram illustrating a cross-sectional view of a magnetic capacitor comprising magnetic materials with an in-plane anisotropy when the capacitor is charging according to a fifth embodiment of the present application.

FIG. 6 shows a schematic diagram of a cross-sectional view of a magnetic capacitor 60 according to a fifth embodiment of the present application. The capacitor 60 comprises two sections 62 and 64 electrically coupled to a battery 22. The capacitor 60 may comprise two similar sections 62 and 64 stacked above each other. The sections 62 and 64 can be electrically isolated from each other by a spacer layer 66. The sections 62 and 64 can have a structure of the capacitor 40 shown in FIG. 4. The spacer layer 66 can be made of a dielectric or semiconductor material or their based laminates. For example, the spacer layer 66 can be made of 50-nm thick film of $SiO_2$. The sections 62 and 64 are electrically coupled to each other in parallel. For example, pinned magnetic layers 14 of the sections 62 and 64 are coupled in parallel to each other by means of first electrodes 11. The magnetization directions 24 in the magnetic layers 14 are parallel to each other. Respectively, free magnetic layers 15 of the sections 62 and 64 are coupled in parallel with each other by means of second electrodes 12. The magnetization directions 25 of the magnetic layers 15 are parallel to each other. Then, the first electrodes 11 of the sections 62 and 64 are electrically coupled to a first terminal of the battery 22. Respectively, the second electrodes 12 are electrically coupled to a second terminal of the battery 22. The parallel coupling of the first and second electrodes is similar to a parallel coupling of two capacitors. The number of sections in the capacitor 60 can be any.

Each of the sections 62 and 64 arranged in a parallel configuration is exposed to the same applied voltage. Their capacitances add up. An electric charge is distributed among the sections according to their capacitances. Accordingly, the total capacitance of the two sections 62 and 64 represents a sum of their capacitances:

$$C_{TOTAL} = C_{62} + C_{64} \quad (2)$$

Figure 7:
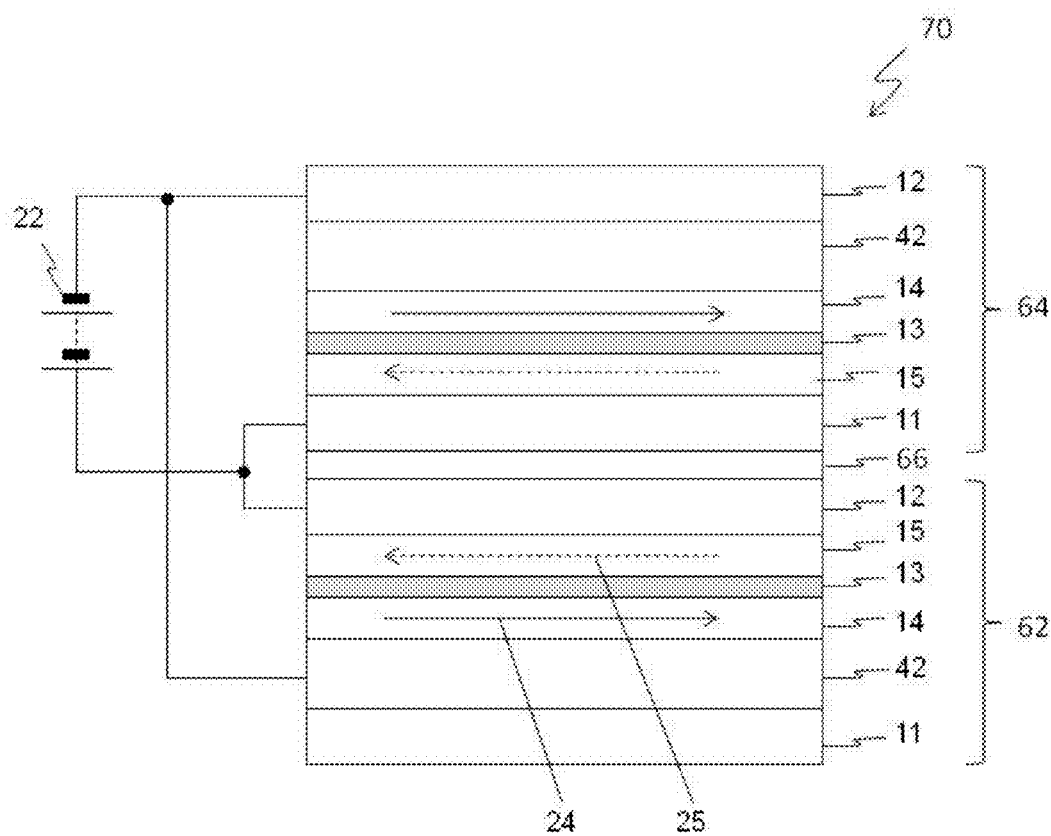
FIG. 7 is a schematic diagram illustrating a cross-sectional view of a magnetic capacitor comprising magnetic materials with an in-plane anisotropy when the capacitor is charging according to a sixth embodiment of the present application.

FIG. 7 shows a schematic diagram of a cross-sectional view of a capacitor 70 when the capacitor is charging according to of a sixth embodiment to the present application. Sections 62 and 64 of the capacitor 70 are connected to each other in parallel. The sections 62 and 64 are electrically isolated from each other by a spacer layer 66. The section 64 has a reversed order of layers in a stack respectively to that of the section 62. Pinned magnetic layers 14 of the sections 62 and 64 are in parallel electrically coupled to a second terminal of a battery 22. Respectively, free magnetic layers 15 of the sections 62 and 64 are in parallel electrically coupled to a first terminal of the battery 22.

Figure 8:
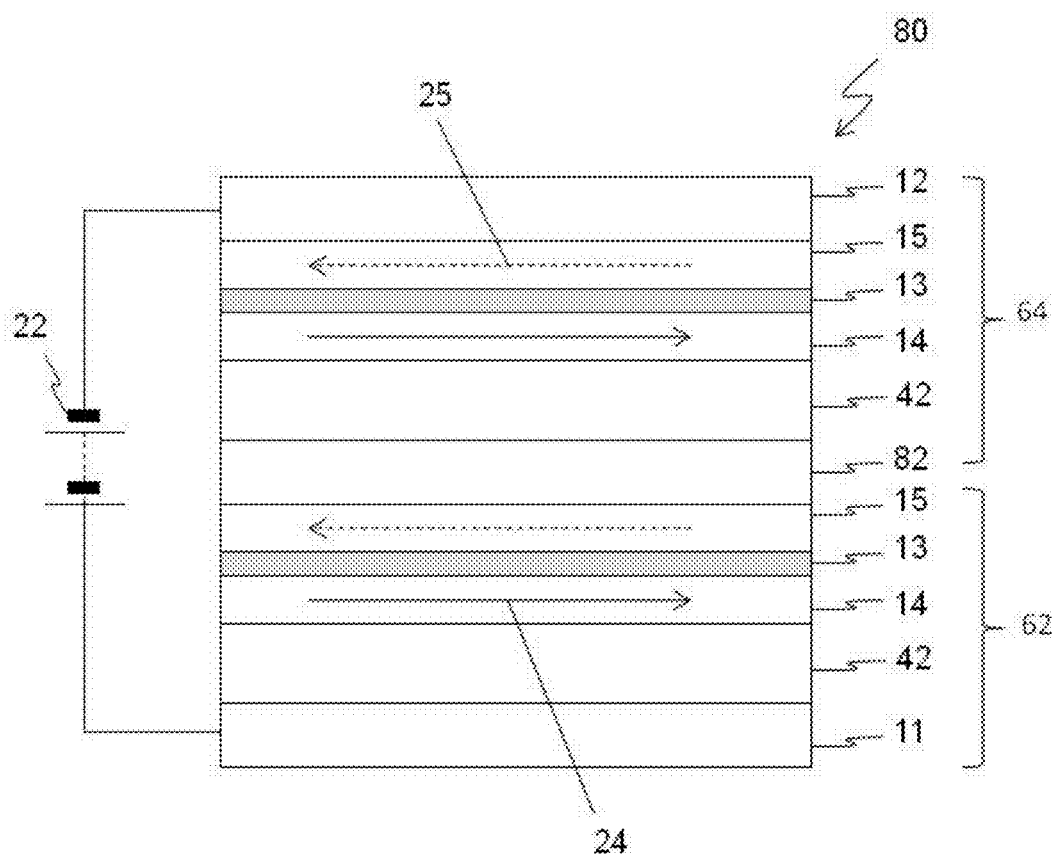
FIG. 8 is a schematic diagram illustrating a cross-sectional view of a magnetic capacitor comprising magnetic materials with an in-plane anisotropy when the capacitor is charging according to a seventh embodiment of the present application.

FIG. 8 shows a schematic diagram of a cross-sectional view of a capacitor 80 when the capacitor is charging according to a seventh embodiment of the present application. Sections 62 and 64 of the capacitor 80 are connected in series to each other by means of a conductive spacer layer 82. A free magnetic layer 15 of the section 62 is electrically coupled to a pinned magnetic layer 14 of the section 64 through the conductive spacer layer 82.

Each of the sections 62 and 64 comprises an anti-ferromagnetic pinning layer 42 exchange coupled to a pinned magnetic layer 14, a free magnetic layer 15, and an isolative layer 13 disposed between the pinned and free magnetic layers 14 and 15, respectively.

A first electrode 11 and the conductive spacer layer 82 of the capacitor 80 can be made of Ta(10 nm)/NiFe(5 nm) multilayer. In each section the anti-ferromagnetic pinning layer 42 can be made of a 10-nm thick film of IrMn and the magnetic layer 14 can be made of 3-nm thick film of CoFe having a high spin polarization. 2.5-nm thick film of SiO2 can be used for formation of the isolative layer 13. A second electrode 12 can be made of Ta(5 nm)/Ru(5 nm) multilayer.

Each section of the capacitor 80 shown in FIG. 8 can store an equal electrical charge. The total capacitance of the two sections connected in series is smaller than that of any of its components:

$$\frac{1}{C_{TOTAL}} = \frac{1}{C_{62}} + \frac{1}{C_{64}} \quad (3)$$

However, the capacitor 80 comprising several sections connected in series can operate under higher voltage. The number of sections in the stack of the capacitor 80 can be any.

Figure 9:
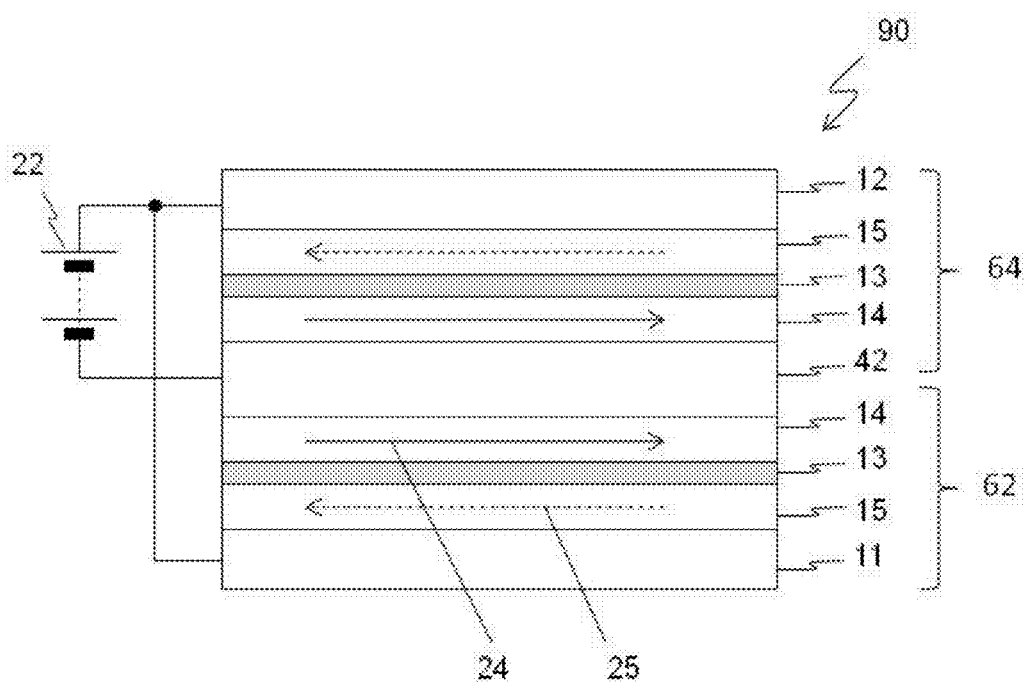
FIG. 9 is a schematic diagram illustrating a cross-sectional view of a magnetic capacitor comprising magnetic materials with an in-plane anisotropy when the capacitor is charging according to a eighth embodiment of the present application.

FIG. 9 shows a schematic diagram of a cross-sectional view of a magnetic capacitor 90 when the capacitor is charging according to an eighth embodiment of the present application. The capacitor 90 comprises a single anti-ferromagnetic pinning layer 42 providing an exchange coupling to two pinned magnetic layers 14 disposed on opposite sides of the layer 42. Each of the pinned magnetic layers 14 has a fixed magnetization direction 24. The anti-ferromagnetic pinning layer 42 can be made of a 15-nm thick film of PtMn. The pinned magnetic layers 14 of the sections 62 and 64 through the conductive anti-ferromagnetic layer 42 can be electrically coupled to a first terminal of a battery 22. Free magnetic layers 15 of the sections 62 and 64 by means of first 11 and second 12 conductive electrodes of the capacitor 90 can be coupled in parallel to a second terminal of the battery 22.

Figure 10:
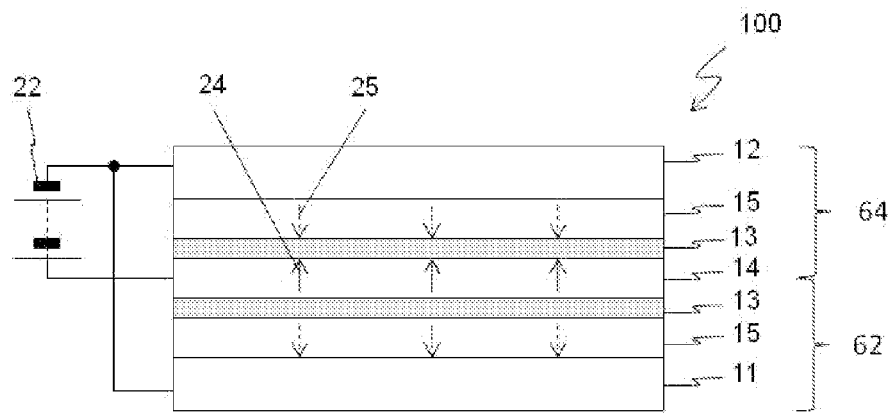
FIG. 10 is a schematic diagram illustrating a cross-sectional view of a magnetic capacitor comprising magnetic materials with a perpendicular anisotropy when the capacitor is charging according to a ninth embodiment of the present application.

FIG. 10 shows a schematic diagram illustrating a cross-sectional view of a magnetic capacitor 100 comprising magnetic materials with a perpendicular anisotropy when the capacitor is charging according to a ninth embodiment of the present application. The capacitor 100 comprises two sections 62 and 64 stacked in a vertical direction. The sections 62 and 64 have a common pinned magnetic layer 14 with a fixed magnetization direction 24. Layers of isolative material 13 and free magnetic layers 15 with reversible magnetization directions 25 are disposed on the opposite sides of the pinned magnetic layer 14. The sections 62 and 64 are coupled in parallel to terminals of battery 22.

Figure 11:
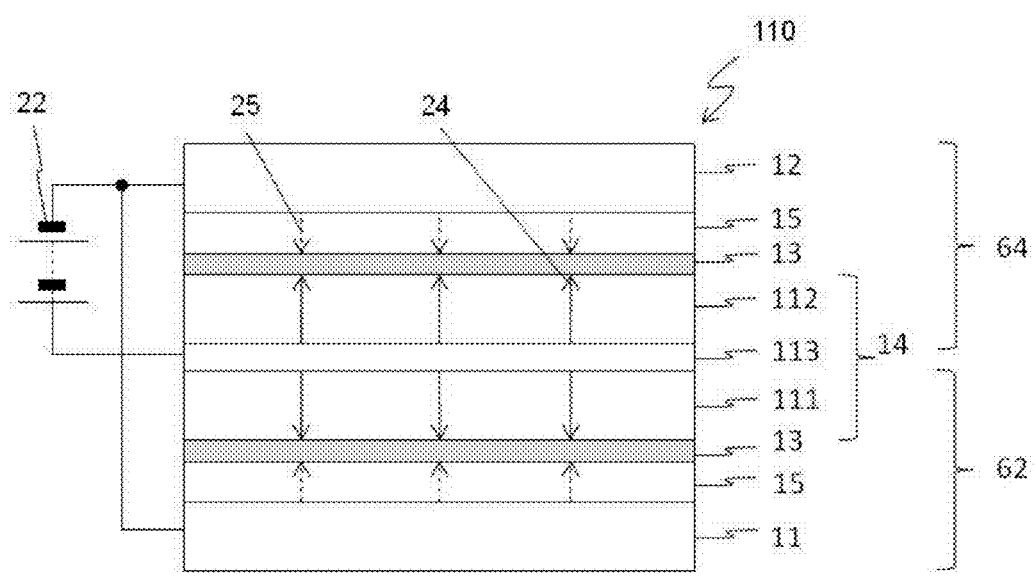
FIG. 11 is a schematic diagram illustrating a cross-sectional view of a magnetic capacitor comprising magnetic materials with a perpendicular anisotropy when the capacitor is charging according to a tenth embodiment of the present application.

FIG. 11 shows a schematic diagram illustrating a cross-sectional view of a magnetic capacitor 110 comprising magnetic materials with a perpendicular anisotropy when the capacitor is charging according to a tenth embodiment of the present application. The capacitor 110 comprises two sections 62 and 64 stacked in a vertical direction. The sections are in parallel coupled to a battery 22. The sections 62 and 64 have a common pinned magnetic layer 14. The layer 14 comprises a magnetic structure of synthetic anti-ferromagnetic (SAF) formed by two magnetic sublayers 111 and 112 separated from each other by a thin non-magnetic conductive spacer layer 113. The magnetic sublayers 111 and 112 have a substantial anti-ferromagnetic exchange coupling between each other through the spacer layer 113. The sublayer 111 can be made of a 3-nm thick film of Co30Fe70. The sublayer 112 can be made of a 10-nm thick film of Co75Pt25 alloy deposited on a 0.9-nm thick film of the non-magnetic conductive spacer layer 113 made of Ru.

Figure 12:
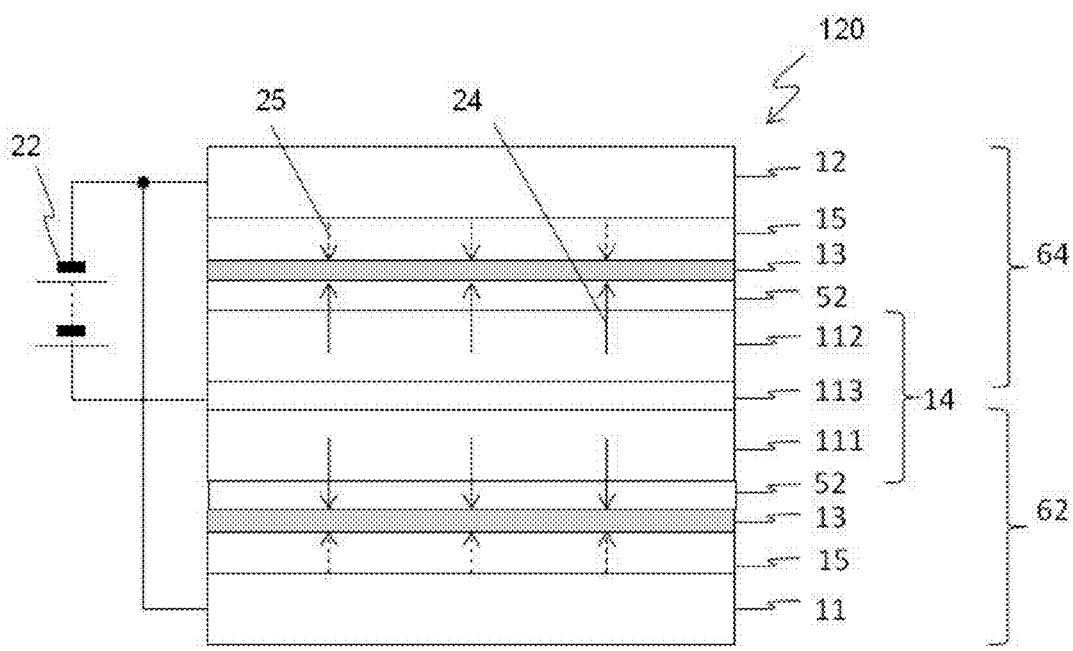
FIG. 12 is a schematic diagram illustrating a cross-sectional view of a magnetic capacitor comprising magnetic materials with a perpendicular anisotropy when the capacitor is charging according to a eleventh embodiment of the present application.

FIG. 12 shows a schematic diagram illustrating a cross-sectional view of a magnetic capacitor 120 comprising magnetic materials with a perpendicular anisotropy when the capacitor is charging according to an eleventh embodiment of the present application. The capacitor 120 comprises two sections 62 and 64 staked in a vertical direction and in parallel coupled to a battery 22. The sections 62 and 64 have a common pinned magnetic layer 14 with fixed magnetization directions. The layer 14 has a SAF structure composed by two magnetic sublayers 111 and 112 exchange coupled to each other through a thin layer of non-magnetic conductive material 113. In addition, the capacitor 120 comprises spin-polarizing layers 52 disposed on both sides of the layer 14 adjacent to isolative layers 13. The capacitor 120 may comprise one spin-polarizing layer 52 disposed adjacent to one of the isolative layers 13. The magnetic sublayers 111 and 112 can be made of $Tb_{22}(Fe_{71}Co_{29})_{78}$ alloy. A thickness of the sublayer 111 can be of about 50 nm. The sublayer 112 can be made of a 40-nm thick film. Moreover, the sublayers 111 and 112 can be made of different magnetic materials. The non-magnetic conductive spacer layer 113 can be made of a 0.9-nm thick Ru film. The spin-polarizing layers 52 can be made of $Co_{30}Fe_{70}$ film.

There is a wide latitude for the choice of materials and their thicknesses within the embodiments of the present application.

The conductive electrodes 11 and 12 can be made of a conductive material such as Ta, Ru, Ti, Pt, Pd, Au, Cu, Al, W, TiN, TaN and similar, their based alloys and/or laminates. Thickness of the conductive electrodes 11 and 12 can be in a range from about 1 nm to about 1 μm.

The isolative layer 13 can be made of $SiO_2$, $Al_2O_3$, and similar materials; transition metal oxides (TMO) such as $Ti_xO_y$, $V_xO_y$, $Cr_xO_y$, $Mn_xO_y$, $Fe_xO_y$, $Co_xO_y$, NiO, $Cu_xO_y$, ZnO, $Zr_xO_y$, $Nb_xO_y$, $Mo_xO_y$, $Ta_xO_y$, $RuO_2$, PdO, CdO, $HfO_2$, $W_xO_y$ and similar materials; perovskite-type materials $LaAlO_3$, $BaTiO_3$, $SrTiO_3$, $LaAlO_3$, $BaTiO_3$, $LiNbO_3$, $Pb[Zr_xTi_{1-x}]O_3$ and similar, or their based laminates. The isolative layer 13 can be made of semiconductor materials such as Si, Ge, C, Se, Te, SiC, BN, AlN, GaN, GaP, GaAs, GaP, InP, CdS, CdSe, CdTe, poly-Si and similar, or their laminates. Thickness of the isolative layer 13 can be in a range from about 0.5 nm to about 100 nm.

The magnetic layers 14 and 15 can be made of magnetic material comprising at least one element selected from a group consisting of Fe, Co, Ni, their based alloys and laminates. For example, the magnetic layer 14 and 15 can be made of Co, Fe, CoFe, CoFeB, CoFeVB, NiFe and similar, laminates (Co/Pt)n, (Co/Pd)n, (CoFe/Pt)n and similar, disordered alloys CoPt, CoCr, CoPtCr, CoCrTa, CoCrNb and similar, ordered alloys such as $Fe_{50}Pt_{50}$, $Fe_{50}Pd_{50}$, $Co_{50}Pt_{50}$, $Fe_{30}Ni_{20}Pt_{50}$, $Co_{30}Fe_{20}Pt_{50}$, $Co_{30}Ni_{20}Pt_{50}$ and similar, artificial lattices such as Co/Pt, Co/Pd, Co/Ru, CoFe/Pt, Co/Os, Ni/Co, Co/W, Co/Ta and similar, ferrimagnetic materials such as TbFe, TbCo, TbFeCo, DyTbFeCo, GdTbCo and similar. A thickness of the magnetic layers 14 and 15 can be in a range from of about 1 nm to about 100 nm.

An anti-ferromagnetic layer 42 can be made of alloys of Mn with Fe, Ni, Pt, Pd, Ru, Ir, or Os such as FeMn, NiMn, PtMn, PtPdMn, IrMn, CrPtMn, RuMn, OsMn and their based laminates. Thickness of the anti-ferromagnetic layer 42 can be in a range from 2 nm to 100 nm.

A spin-polarizing layer 52 can be made of magnetic materials comprising Fe, Co, Ni, their based alloys and laminates, such as Co, Fe, CoFe, CoFeB, NiFe, NiCo and similar. Thickness of the spin-polarizing layer 52 can be in a range from 0.2 nm to 5 nm.

The spacer layer 66 can be made of a dielectric material such $SiO_2$, $Al_2O_3$, $Si_3N_4$, $Ta_2O_5$ and similar or semiconductor materials such as C, SiC, BN, BP, AlN, AlP, GaN, ZnO and similar, or their based laminates. The spacer layer 66 can be made of polymer materials such as fluropolyimide, polyethylene, polypropylene and similar. Thickness of the spacer layer 66 can be in a range from about 1 nm to about 1 μm.

The conductive spacer layer 82 can be made of metallic materials such as Ta, Ru, Ti, Pt, Pd, Au, Cu, Ni, W, TiN, and similar, their based alloys and/or laminates. Thickness of the layer 82 can be in a range from about 1 nm to about 1 μm.

Magnetic sublayers 111 and 112 can be made of materials similar to those of the layers 14 and 15. Thickness of the sublayers 111 and 112 can be in a range from 1 nm to 100 nm.

A non-magnetic conductive spacer layer 113 can be made of Ru, Rh, Ir, Re, Cu, Cr, V, W, Mo, Ta, their based alloys and laminates. Thickness of the spacer layer 113 can be in a range from 0.2 nm to 30 nm.

While the specification of this disclosure contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It is understood that the above embodiments are intended to be illustrative, and not restrictive. Many other embodiments will be apparent to those of skill in the art upon reviewing the above description. The scope of the embodiments should be, therefore, determined with reference to the appended claims, along with the full scope of equivalents to which such claims are entitled.

While the disclosure has been described in terms of several exemplary embodiments, those skilled in the art will recognize that the disclosure can be practiced with modification within the spirit and scope of the appended claims. Specifically, one of ordinary skill in the art will understand that the drawings herein are meant to be illustrative, and the spirit and scope of the disclosure are not limited to the embodiments and aspects disclosed herein but may be modified.

What is claimed is:

1. An apparatus for storing electrical energy comprising at least:
a first multilayer section;
a second multilayer section disposed above the first multilayer section; and
a spacer layer disposed between the first and second multilayer sections and comprising a dielectric material,
wherein each of the first and second multilayer sections comprising a pinned magnetic layer having a fixed magnetization direction, a free magnetic layer having a reversible magnetization direction, and an isolative layer disposed between the pinned and free magnetic layers, the pinned and free magnetic layers are substantially anti-ferromagnetically exchange coupled to each other through the isolative layer; and
wherein the pinned magnetic layers of the first and second multilayer sections are electrically coupled in parallel with each other, and the free magnetic layers of the first and second multilayer sections are electrically coupled in parallel with each other.

2. The apparatus of claim 1, wherein the isolative layer comprising a transition metal oxide.

3. The apparatus of claim 1, wherein the isolative layer comprising a perovskite-type oxide.

4. The apparatus of claim 1, wherein the isolative layer comprising a semiconductor material having a doping concentration not more than $10^{15}$ cm$^{-3}$.

5. The apparatus of claim 1, wherein the pined and free magnetic layers comprising magnetic materials having an in-plane magnetic anisotropy.

6. The apparatus of claim 1, wherein the pinned and free magnetic layers comprising magnetic materials having a perpendicular magnetic anisotropy.

7. The apparatus of claim 1, further comprising a pinning layer disposed adjacent to a side of the pinned magnetic layer opposite to the isolative layer and having a direct contact with the pinned magnetic layer.

8. The apparatus of claim 7, wherein the pinning layer comprising an anti-ferromagnetic material.

9. The apparatus of claim 8, wherein the anti-ferromagnetic material comprising a Mn-based alloy.

10. The apparatus of claim 1, further comprising an electrical battery including:
a first terminal; and
a second terminal,
wherein the pinned magnetic layers are electrically coupled to the first terminal and
the free magnetic layers are electrically coupled to the second terminal.

11. An apparatus for storing electrical energy comprising:
an electrical battery;
a pinned magnetic layer comprising a fixed magnetization direction;
a first free magnetic layer disposed adjacent to a first side of the pinned magnetic layer and comprising a reversible magnetization direction;
a first isolative layer disposed between the pinned magnetic layer and the first free magnetic layer;
a second free magnetic layer disposed adjacent to a second side of the pinned magnetic layer and comprising a reversible magnetization direction; and
a second isolative layer disposed between the pinned magnetic layer and the second free magnetic layer,
wherein the first free magnetic layer and the second free magnetic layer are substantially anti-ferromagnetically exchange coupled to the pinned magnetic layer; and
wherein the pinned magnetic layer is electrically coupled to a first terminal of the battery and the first and second free magnetic layers are in parallel electrically coupled to a second terminal of the battery.

12. The apparatus of claim 11, wherein the pinned magnetic layer comprising a synthetic anti-ferromagnetic structure.

13. The apparatus of claim 11, further comprising at least a first spin-polarizing layer disposed between the pinned magnetic layer and the first isolative layer.

14. An apparatus for storing electrical energy comprising:
a first multilayer section;
a second multilayer section disposed above the first multilayer section; and
a spacer layer disposed between the first and second multilayer sections and comprising a metallic material,
wherein each of the first and second multilayer sections comprising a pinning layer, a pinned magnetic layer having a fixed magnetization direction, a free magnetic layer having a reversible magnetization direction, and an isolative layer disposed between the pinned and free magnetic layers; and
wherein the free magnetic layer of the first multilayer section is electrically coupled in series with the pinned magnetic layer of the second multilayer section through the spacer layer.

15. The apparatus of claim 14, wherein the pinning layer comprising a metallic anti-ferromagnetic material.

16. The apparatus of claim 14, wherein the isolative layer comprising a transition metal oxide.

17. The apparatus of claim 14, wherein the isolative layer comprising a perovskite-type oxide.

18. The apparatus of claim 14, wherein the isolative layer comprising a semiconductor material having a doping concentration not more than $10^{15}$ cm$^{-3}$.

19. The apparatus of claim 14, further comprising an electrical battery including:
a first terminal; and
a second terminal,
wherein the pinned magnetic layer of the first multilayer section is electrically coupled to the first terminal, and the free magnetic layer of the second multilayer section is electrically coupled to the second terminal.

* * * * *